(12) United States Patent
Brutscher et al.

(10) Patent No.: US 10,279,407 B2
(45) Date of Patent: May 7, 2019

(54) CIRCULAR SAW BLADES

(71) Applicant: BLACK & DECKER INC., New Britain, CT (US)

(72) Inventors: David Brutscher, Simpsonville, KY (US); James R. Niblett, Ellicott City, MD (US); David N. Johnson, South Yorkshire (GB); Sajid A. Roomy, Louisville, KY (US); John P. Wells, Eminence, KY (US)

(73) Assignee: BLACK & DECKER INC., New Britain, CT (US)

( * ) Notice: Subject to any disclaimer, the term of this patent is extended or adjusted under 35 U.S.C. 154(b) by 72 days.

(21) Appl. No.: 15/178,615

(22) Filed: Jun. 10, 2016

(65) Prior Publication Data

US 2017/0120355 A1 May 4, 2017

Related U.S. Application Data

(60) Provisional application No. 62/248,348, filed on Oct. 30, 2015.

(51) Int. Cl.
*B23D 57/00* (2006.01)
*B27B 13/02* (2006.01)
(Continued)

(52) U.S. Cl.
CPC ......... *B23D 61/021* (2013.01); *B23D 61/025* (2013.01); *B23D 61/04* (2013.01)

(58) Field of Classification Search
CPC ..... B23D 61/021; B23D 61/025; B23D 61/04
(Continued)

(56) References Cited

U.S. PATENT DOCUMENTS 191,198 A 5/1877 Tilton
1,083,645 A 1/1914 Wettstein
(Continued)

FOREIGN PATENT DOCUMENTS

DE 1479819 A1 4/1970
DE 2917091 A1 11/1980
(Continued)

OTHER PUBLICATIONS

D'Andrea, Angela—European Search Report re related European Patent Application No. EP16195795—dated Feb. 7, 2017—11 pages—The Hague.
(Continued)

*Primary Examiner* — Ghassem Alie
*Assistant Examiner* — Bharat C Patel
(74) *Attorney, Agent, or Firm* — Scott B. Markow

(57) ABSTRACT

A circular saw blade includes a circular plate having a diameter, a thickness, a left face, a right face, a peripheral rim, and a central opening. A plurality of alternating teeth and gullets are disposed about the peripheral rim, each tooth having a front face facing generally toward an adjacent gullet in the cutting direction and a recess defined in the front face. A plurality of cutting inserts are affixed in the recesses in the teeth. Each insert has rake face facing generally toward the adjacent gullet in the cutting direction, a relief face extending generally toward the adjacent top face, and a cutting edge at a junction between the relief face and the rake face. Each rake face is disposed at a hook angle. The relief faces include unbeveled relief faces, left-beveled relief faces, and a right-beveled relief faces arranged in an alternating top bevel with raker pattern.

20 Claims, 7 Drawing Sheets

(51) Int. Cl.
*B23D 61/02* (2006.01)
*B23D 61/04* (2006.01)

(58) Field of Classification Search
USPC .......................................................... 83/835
See application file for complete search history.

(56) References Cited

U.S. PATENT DOCUMENTS

| | | | | |
|---|---|---|---|---|
| 3,309,756 | A * | 3/1967 | Segal | B23D 61/021 407/58 |
| 3,833,368 | A | 9/1974 | Land et al. | |
| 3,973,455 | A * | 8/1976 | Slaats | B23D 61/021 76/115 |
| 4,011,783 | A * | 3/1977 | Mobley | B23D 61/021 83/846 |
| 4,173,914 | A * | 11/1979 | Vollmer | B23D 61/021 83/835 |
| 4,574,676 | A | 3/1986 | Jansen-Herfeld | |
| 4,604,933 | A * | 8/1986 | Lesher | B23D 61/021 83/839 |
| 4,640,172 | A * | 2/1987 | Kullmann | B23D 61/021 83/835 |
| 4,776,251 | A | 10/1988 | Carter, Jr. | |
| 4,794,835 | A | 1/1989 | Fujiyoshi | |
| 5,012,792 | A | 5/1991 | Kawata et al. | |
| 5,038,653 | A * | 8/1991 | Slocum | B23D 61/021 83/846 |
| 5,182,976 | A | 2/1993 | Wittkopp | |
| 5,351,595 | A | 10/1994 | Johnston | |
| 5,425,296 | A * | 6/1995 | Kullmann | B23D 61/021 83/676 |
| 5,555,788 | A | 9/1996 | Gakhar et al. | |
| D382,185 | S | 8/1997 | Gakhar et al. | |
| D382,787 | S | 8/1997 | Gakhar et al. | |
| 5,896,800 | A * | 4/1999 | Curtsinger | B23D 61/025 83/835 |
| D442,979 | S | 5/2001 | Turner et al. | |
| 6,405,575 | B1 | 6/2002 | Petniunas et al. | |
| D485,478 | S | 1/2004 | Sakai | |
| 7,156,010 | B2 | 1/2007 | Asada | |
| D587,979 | S | 3/2009 | Jeiziner et al. | |
| 8,042,443 | B2 | 10/2011 | Nishio et al. | |
| 8,347,873 | B2 | 1/2013 | Baratta et al. | |
| D677,290 | S | 3/2013 | Brutscher et al. | |
| D677,291 | S | 3/2013 | Brutscher et al. | |
| D703,708 | S | 4/2014 | Lizzi | |
| D704,754 | S | 5/2014 | Lizzi | |
| 9,162,299 | B2 * | 10/2015 | Kullmann | B23D 61/121 |
| D745,354 | S | 12/2015 | Butler | |
| D745,355 | S | 12/2015 | Butler | |
| D745,356 | S | 12/2015 | Butler | |
| 9,789,552 | B2 * | 10/2017 | Engvall | B23D 61/04 |
| 2002/0170410 | A1 * | 11/2002 | Gittel | B23D 61/021 83/835 |
| 2003/0056633 | A1 | 3/2003 | Baron et al. | |
| 2005/0028664 | A1 * | 2/2005 | Terada | B23D 61/021 83/835 |
| 2006/0156892 | A1 * | 7/2006 | Losse | B23D 61/04 83/835 |
| 2006/0243115 | A1 | 11/2006 | Sakai et al. | |
| 2007/0227331 | A1 * | 10/2007 | Nishio | B23D 61/021 83/846 |
| 2008/0307941 | A1 * | 12/2008 | Kohl | B23D 61/021 83/835 |
| 2009/0199693 | A1 | 8/2009 | Heyen | |
| 2012/0192694 | A1 | 8/2012 | Brutscher et al. | |
| 2014/0260878 | A1 * | 9/2014 | Bird | B23D 61/025 83/835 |
| 2014/0377021 | A1 * | 12/2014 | Knebel | B23D 61/04 407/52 |
| 2015/0224588 | A1 * | 8/2015 | Kohl | B23D 61/021 83/851 |
| 2015/0266118 | A1 * | 9/2015 | Barbiero | B23D 61/021 83/848 |

FOREIGN PATENT DOCUMENTS

| | | |
|---|---|---|
| DE | 8029139 U1 | 3/1981 |
| DE | 19648129 A1 | 5/1998 |
| DE | 20021919 U1 | 4/2001 |
| DE | 20108572 U1 | 10/2002 |
| DE | 102007022001 B4 | 6/2011 |
| DE | 102012004212 A1 | 9/2013 |
| DE | 102014205445 A1 | 9/2014 |
| EP | 0054885 A2 | 6/1982 |
| EP | 266022 A2 | 7/1987 |
| EP | 0239676 A1 | 10/1987 |
| EP | 580349 A1 | 7/1993 |
| EP | 819491 A1 | 1/1998 |
| EP | 1679165 A1 | 7/2006 |
| EP | 1747832 A1 | 1/2007 |
| EP | 2450141 A1 | 5/2012 |
| EP | 2481509 A1 | 8/2012 |
| JP | 5822623 | 2/1983 |
| JP | 06179117 A * | 6/1994 ........... B23D 61/021 |
| JP | 2003340637 | 12/2003 |
| WO | 198705556 | 9/1987 |
| WO | 9630152 A1 | 10/1996 |
| WO | 0153027 A1 | 7/2001 |
| WO | 2007120440 A2 | 10/2007 |
| WO | 2008135035 A1 | 11/2008 |
| WO | 2013029857 | 3/2013 |

OTHER PUBLICATIONS

D'Andrea, Angela—Communication Pursuant to Article 94(3) EPC re European Patent Appln. No. 16195795.6—dated Jul. 2, 2018—5 pages—European Patent Office—Netherlands.

* cited by examiner

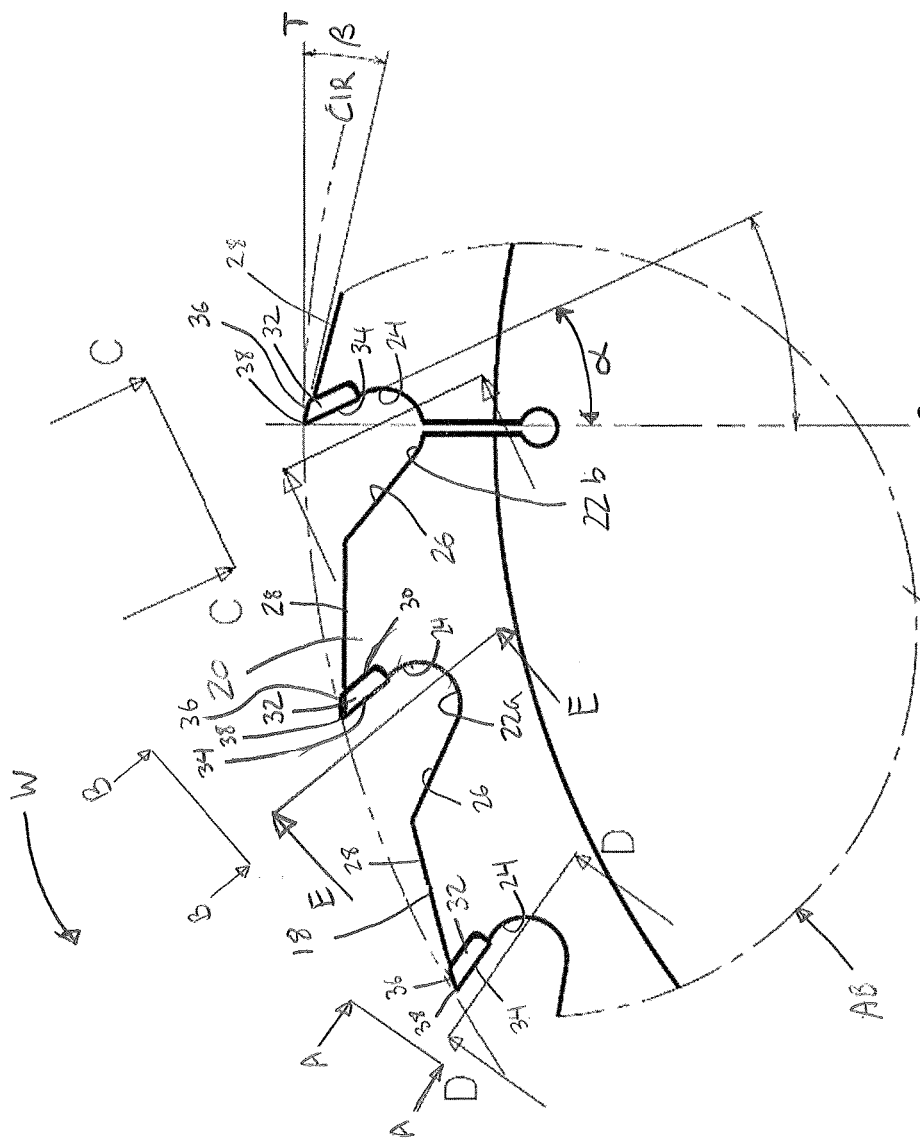

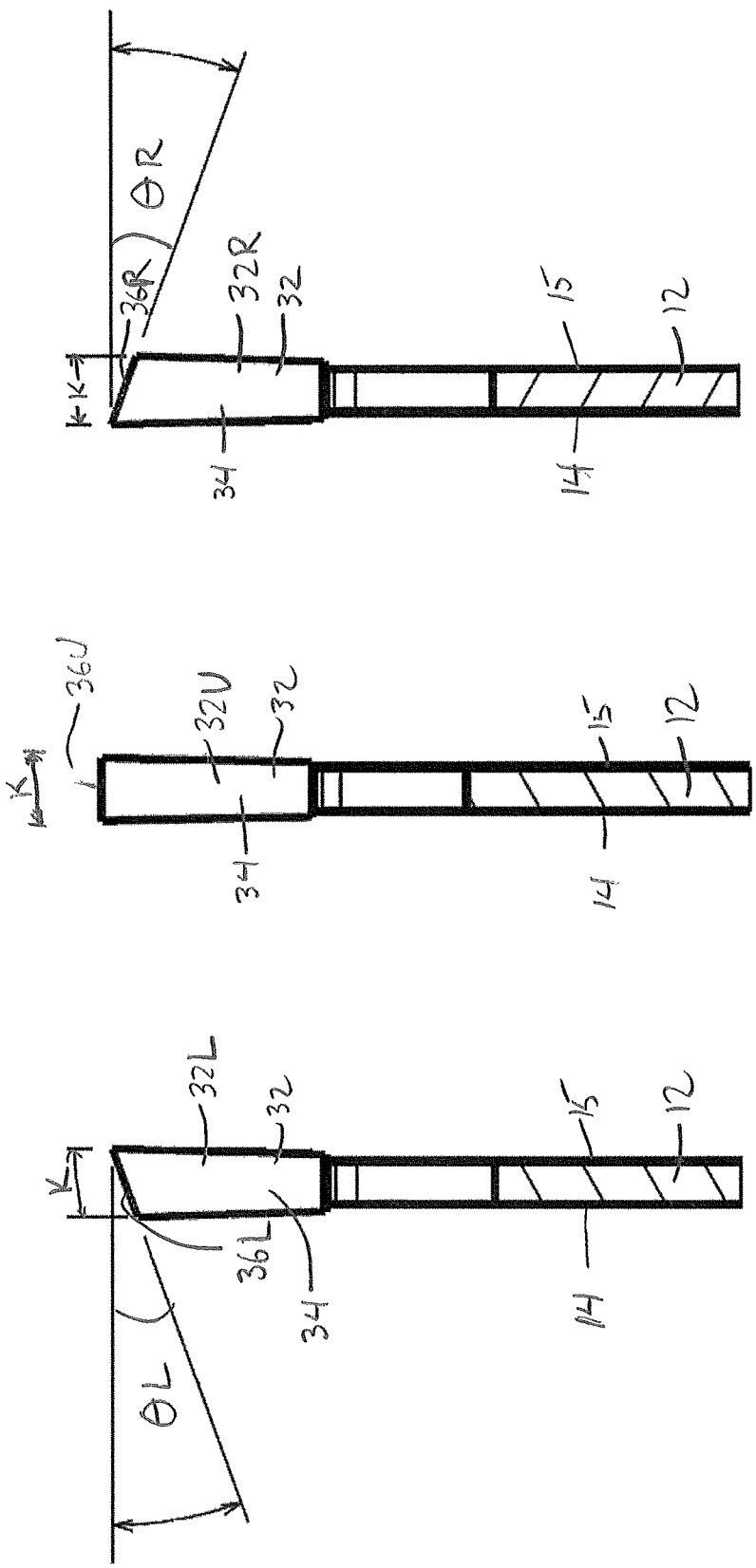

CIRCULAR SAW BLADES

RELATED APPLICATION

This application claims priority, under 35 U.S.C. § 119(e), to U.S. Provisional Patent Application No. 62/248,348, filed Oct. 30, 2015, which is incorporated by reference.

TECHNICAL FIELD

This application relates to circular saw blades for use with powered plunge saws, circular saws, table saws, and miter saws.

BACKGROUND

Circular saw blades, including those with carbide cutting inserts, are known for use with powered plunge saws, powered circular saws, powered table saws, and powered miter saws. Such saw blades generally have a circular plate or body with a rim having a plurality of teeth and gullets, with a carbide cutting insert affixed to each tooth. Examples of such saw blades include the DEWALT DW3199 7.25" 24-Teeth Precision Finishing Circular Saw Blade, the DEWALT DW3178 7.25" 24-Teeth Construction Framing Circular Saw Blade, the DEWALT DW3182 8.25" 24-Teeth Framing Table Saw Blade, the DEWALT DW3178 12" 60-Teeth Fine Finish Miter Saw Blade, and the DEWALT DW3216 12" 60-Teeth Precision Trim™ Miter Saw Blade, all sold by DEWALT Industrial Tool Co. With the advent of cordless plunge saws, circular saws, table saws, and miter saws, there is a need for circular saw blades that have been optimized to enhance runtime of these cordless tools (i.e., the number of cuts that can be performed on a single battery charge).

SUMMARY

This application is related to circular saw blades that have been optimized to enhance runtime when being used with cordless (battery-operated) plunge saws, circular saws, table saws, and miter saws. Runtime, as used herein, refers to the number of cuts that can be performed on a single battery charge using a cordless plunge saw, circular saw, table saw, or miter saw together with the circular saw blades of the present application.

In an aspect, a circular saw blade includes a circular plate having a left face, a right face, a central opening couplable to a power saw for rotation in a cutting direction, and a peripheral rim. A plurality of alternating teeth and gullets are disposed about the peripheral rim. Each tooth has a front face facing generally toward an adjacent gullet in the cutting direction and a recess defined in the front face. A plurality of cutting inserts are affixed in the recesses in the teeth. Each insert has a rake face facing generally toward the adjacent gullet in the cutting direction, a relief face extending generally toward the adjacent top face, and a cutting edge at a junction between the relief face and the rake face. The plate has a thickness T from approximately 0.75 mm to approximately 0.88 mm. Each rake face is disposed at a hook angle $\alpha$ between the rake face and a radius of the circular plate intersecting the cutting edge from approximately 20° to approximately 27°. The plurality of cutting inserts include at least one left-beveled cutting insert with the relief face beveled toward the left face of the plate and at least one right beveled cutting insert with the relief face beveled toward the right face.

Implementations of this aspect may include one or more of the following features. Each top face may have a clearance angle $\beta$ of approximately 10° to approximately 14° (e.g., approximately 12°) between the top face and a line tangent to an outer circumference of the circular plate. The thickness T may be approximately 0.76 mm to approximately 0.82 mm. The hook angle may be approximately 25°. The relief faces of the plurality of cutting inserts may beveled in an alternating top bevel (ATB) pattern. The plurality of cutting inserts may further include at least one unbeveled cutting insert with the relief face not beveled toward either the left face or the right face. The relief faces of the plurality of cutting inserts may be beveled in an alternating top bevel plus raker (ATBR) pattern. The at least one relief face may be beveled toward the left face of the plate is beveled at a top left bevel angle $\theta L$ of approximately 18° to approximately 25° (e.g., approximately 20°) and the at least one relief face may be beveled toward the right face of the plate is beveled at a top right bevel angle $\theta R$ of approximately 18° to approximately 25° (approximately 20°).

Each rake face may have a face bevel angle $\omega$ between the rake face and a line perpendicular to the planet from approximately 6° to approximately 10° (e.g., approximately 8°. Each rake face may have a hollow grind with a concave profile. Each of the cutting inserts may have a kerf width K of approximately 1.19 mm to approximately 1.36 mm (e.g., approximately 1.27 mm). The circular saw blade may improve battery runtime by at least 40% versus a carbide tipped circular saw blade having a plate thickness of approximately 0.99 mm, a hook angle of approximately 18°, a clearance angle of approximately 12°, and alternating left and right top bevels of approximately 15°.

In another aspect, a circular saw blade includes a circular plate having a left face, a right face, a central opening couplable to a power saw for rotation in a cutting direction, and a peripheral rim. A plurality of alternating teeth and gullets are disposed about the peripheral rim. Each tooth has a front face facing generally toward an adjacent gullet in the cutting direction and a recess defined in the front face and intersecting the top face. A plurality of cutting inserts are affixed in the recesses in the teeth. Each insert has a rake face facing generally toward the adjacent gullet in the cutting direction, a relief face extending generally toward the adjacent top face, and a cutting edge at a junction between the relief face and the rake face. The plate has a thickness T from approximately 0.75 mm to approximately 0.88 mm. Each rake face is disposed at a hook angle $\alpha$ between the rake face and a radius of the circular plate intersecting the cutting edge from approximately 20° to approximately 27°. Each top face has a clearance angle $\beta$ of approximately 12° between the top face and a line tangent to an outer circumference of the circular plate. Each rake face has a face bevel angle $\omega$ between the rake face and a line perpendicular to the planet from approximately 6° to approximately 10°. The relief faces of the plurality of cutting inserts are in a repeating pattern of relief faces beveled toward the left face, cutting inserts beveled toward the right face, and unbeveled cutting inserts in an alternating top bevel plus raker (ATBR) pattern.

Implementations of this aspect may include one or more of the following features. Each of the beveled relief faces may be beveled at a bevel angle from approximately 18° to approximately 25° (e.g., approximately 20°). Each of the cutting inserts may have a kerf width K of approximately 1.19 mm to approximately 1.36 mm. The circular saw blade improves battery runtime by at least 40% versus a carbide tipped circular saw blade having a plate thickness of approximately 0.99 mm, a hook angle of approximately 18°, a clearance angle of approximately 12°, and alternating left and right top bevels of approximately 15°.

In another aspect, a circular saw blade includes a circular plate having a diameter D, a thickness T, a left face, a right face, a peripheral rim, and a central opening couplable to a powered saw for rotation in a cutting direction. A plurality of alternating teeth and gullets are disposed about the peripheral rim. Each tooth has a front face facing generally toward an adjacent gullet in the cutting direction and a recess defined in the front face. A plurality of cutting inserts are each affixed in one of the recesses in the teeth and each has a rake face facing generally toward the adjacent gullet in the cutting direction, a relief face extending generally toward the adjacent top face, and a cutting edge at a junction between the relief face and the rake face. Each rake face is disposed at a hook angle $\alpha$ between the rake face and a radius of the circular plate intersecting the cutting edge. The relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern. The saw blade may have one of a plurality of different diameters. If the plate diameter D is 6.5", the plate thickness T is 1.20 mm to 1.34 mm, and the hook angle $\alpha$ is 8° to 12°. If the plate diameter D is 7.25" to 7.50", the plate thickness T is 0.75 mm to 1.06 mm, and the hook angle $\alpha$ is 18° to 27°. If the plate diameter D is 8.25" to 8.50", the plate thickness T is 1.17 mm to 1.67 mm, and the hook angle $\alpha$ is 18° to 27°. If the plate diameter D is 10" to 12", the plate thickness T is 1.53 mm to 1.67 mm, and the hook angle $\alpha$ is 5° to 10°.

Implementations of this aspect may include one or more of the following features. Each relief face has a clearance angle $\beta$ between the relief face and a line tangent to an outer circumference of the circular plate that intersects the cutting edge. If the plate diameter D is 6.5", the clearance angle $\beta$ is 12° to 18°. If the plate diameter D is 7.25" to 7.50", the clearance angle $\beta$ is 10° to 15°. If the plate diameter D is 8.25" to 8.50", the clearance angle $\beta$ is 12° to 18°. If the plate diameter D is 10" to 12", the clearance angle $\beta$ is 12° to 18°.

The left-beveled relief faces and the right-beveled relief faces may be beveled toward the left and right faces of the circular plate at top bevel angles. If the plate diameter is 6.50", the top bevel angles are 18° to 25°. If the plate diameter is 7.25" to 7.50", the top bevel angles are 18° to 25°. If the plate diameter D is 8.25" to 8.50", the top bevel angles are 12° to 20°. If the plate diameter D is 10" to 12", the top bevel angles are 12° to 20°.

The rake faces may include a plurality of left-beveled rake faces and a plurality of right-beveled rake faces beveled toward the left and right faces of the circular plate at left and right rake face bevel angles $\omega L$ and $\omega R$ relative to a line L perpendicular to the circular plate. The rake faces may include a plurality of unbeveled rake faces, the rake faces being arranged in an alternating top bevel plus raker (ATB+R) pattern. The left and right rake face bevel angles $\omega L$ and $\omega R$ are each 2° to 10°. Each rake face may have a hollow grind with a concave profile.

Each of the cutting inserts may have a kerf width K. If the plate diameter D is 6.5", the kerf width K is 1.86 mm to 2.0 mm. If the plate diameter D is 7.25" to 7.50", the kerf width K is 1.48 mm to 1.62 mm. If the plate diameter D is 8.25" to 8.50", the kerf width K is 1.73 mm to 2.23 mm. If the plate diameter D is 10" to 12", the kerf width K is 2.09 mm to 2.23 mm.

In another aspect, a circular saw blade includes a circular plate having a diameter D, a thickness T, a left face, a right face, a peripheral rim, and a central opening couplable to a powered saw for rotation in a cutting direction. A plurality of alternating teeth and gullets are disposed about the peripheral rim. Each tooth has a front face facing generally toward an adjacent gullet in the cutting direction and a recess defined in the front face. A plurality of cutting inserts are each affixed in one of the recesses in the teeth and each has a rake face facing generally toward the adjacent gullet in the cutting direction, a relief face extending generally toward the adjacent top face, and a cutting edge at a junction between the relief face and the rake face. The relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern. The rake faces include a plurality of the left-beveled rake faces beveled toward the left face of the circular plate at a left rake face bevel angle $\omega L$ of 2° to 10° relative to a line L perpendicular to the plate, a plurality of right-bevel rake faces beveled toward the right face of the circular plate at a right rake face bevel angle of 2° to 10° relative to the line L, and a plurality of unbeveled rake faces. The rake faces are arranged in an alternating top bevel plus raker (ATB+R) pattern.

Implementations of this aspect may include one or more of the following features. The plate diameter may be one a plurality of diameters. If the plate diameter D is 6.5", the plate thickness T is 1.20 mm to 1.34 mm. If the plate diameter D is 7.25" to 7.50", the plate thickness T is 0.75 mm to 1.06 mm. If the plate diameter D is 8.25" to 8.50", the plate thickness T is 1.17 mm to 1.67 mm. If the plate diameter D is 10" to 12", the plate thickness T is 1.53 mm to 1.67 mm.

Each rake face may be disposed at a hook angle $\alpha$ between the rake face and a radius of the circular plate intersecting the cutting edge. If the plate diameter D is 6.5", the hook angle $\alpha$ is 8° to 12°. If the plate diameter D is 7.25" to 7.50", the hook angle $\alpha$ is 18° to 27°. If the plate diameter D is 8.25" to 8.50", the hook angle $\alpha$ is 18° to 27°. If the plate diameter D is 10" to 12", the hook angle $\alpha$ is 5° to 10°.

Each relief face may have a clearance angle $\beta$ between the relief face and a line tangent to an outer circumference of the circular plate that intersects the cutting edge. If the plate diameter D is 6.5", the clearance angle $\beta$ is 12° to 18°. If the plate diameter D is 7.25" to 7.50", the clearance angle $\beta$ is 10° to 15°. If the plate diameter D is 8.25" to 8.50", the clearance angle $\beta$ is 12° to 18°. If the plate diameter D is 10" to 12", the clearance angle $\beta$ is 12° to 18°.

The left-beveled relief faces and the right-beveled relief faces may be beveled toward the left and right faces of the circular plate at top bevel angles. If the plate diameter is 6.50", the top bevel angles are 18° to 25°. If the plate diameter is 7.25" to 7.50", the top bevel angles are 18° to 25°. If the plate diameter D is 8.25" to 8.50", the top bevel angles are 12° to 20°. If the plate diameter D is 10" to 12", the top bevel angles are 12° to 20°.

Each of the cutting inserts may have a kerf width K. If the plate diameter D is 6.5", the kerf width K is 1.86 mm to 2.0 mm. If the plate diameter D is 7.25" to 7.50", the kerf width K is 1.48 mm to 1.62 mm. If the plate diameter D is 8.25" to 8.50", the kerf width K is 1.73 mm to 2.23 mm. If the plate diameter D is 10" to 12", the kerf width K is 2.09 mm to 2.23 mm.

In another aspect, a circular saw blade includes a circular plate having a diameter D, a thickness T, a left face, a right face, a peripheral rim, and a central opening coupleable to a powered saw for rotation in a cutting direction. A plurality of alternating teeth and gullets are disposed about the peripheral rim. Each tooth has a front face facing generally toward an adjacent gullet in the cutting direction and a recess defined in the front face. A plurality of cutting inserts are each affixed in one of the recesses in the teeth and each has a rake face facing generally toward the adjacent gullet in the cutting direction, a relief face extending generally toward the adjacent top face, and a cutting edge at a junction between the relief face and the rake face. The relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern. A ratio of the thickness T (in mm) to the diameter D (in inches) is 0.10 mm/inch to 0.19 mm/inch. Each rake face disposed at a hook angle α between the rake face and a radius of the circular plate intersecting the cutting edge. The hook angle α is 15° to 27° if the saw blade is for use with a plunge saw, a circular saw or a table saw and the hook angle α is 5° to 10° if the saw blade is for use with a miter saw.

Implementations of this aspect may include one or more of the following features. The plate diameter may be one a plurality of diameters. If the plate diameter D is 6.5", the plate thickness T is 1.20 mm to 1.34 mm. If the plate diameter D is 7.25" to 7.50", the plate thickness T is 0.75 mm to 1.06 mm. If the plate diameter D is 8.25" to 8.50", the plate thickness T is 1.17 mm to 1.67 mm. If the plate diameter D is 10" to 12", the plate thickness T is 1.53 mm to 1.67 mm.

Each rake face may be disposed at a hook angle α between the rake face and a radius of the circular plate intersecting the cutting edge. If the plate diameter D is 6.5", the hook angle α is 8° to 12°. If the plate diameter D is 7.25" to 7.50", the hook angle α is 18° to 27°. If the plate diameter D is 8.25" to 8.50", the hook angle α is 18° to 27°. If the plate diameter D is 10" to 12", the hook angle α is 5° to 10°.

Each relief face may have a clearance angle β between the relief face and a line tangent to an outer circumference of the circular plate that intersects the cutting edge. If the plate diameter D is 6.5", the clearance angle β is 12° to 18°. If the plate diameter D is 7.25" to 7.50", the clearance angle β is 10° to 15°. If the plate diameter D is 8.25" to 8.50", the clearance angle β is 12° to 18°. If the plate diameter D is 10" to 12", the clearance angle β is 12° to 18°.

The left-beveled relief faces and the right-beveled relief faces may be beveled toward the left and right faces of the circular plate at top bevel angles. If the plate diameter is 6.50", the top bevel angles are 18° to 25°. If the plate diameter is 7.25" to 7.50", the top bevel angles are 18° to 25°. If the plate diameter D is 8.25" to 8.50", the top bevel angles are 12° to 20°. If the plate diameter D is 10" to 12", the top bevel angles are 12° to 20°.

Each of the cutting inserts may have a kerf width K. If the plate diameter D is 6.5", the kerf width K is 1.86 mm to 2.0 mm. If the plate diameter D is 7.25" to 7.50", the kerf width K is 1.48 mm to 1.62 mm. If the plate diameter D is 8.25" to 8.50", the kerf width K is 1.73 mm to 2.23 mm. If the plate diameter D is 10" to 12", the kerf width K is 2.09 mm to 2.23 mm.

Advantages may include one or more of the following. The circular saw blades of the present disclosure greatly improves runtime of cordless circular saws, plunges saws, table saws, and miter saws, while preserving both the speed and quality of cuts as compared to existing circular saw blades. These and other advantages and features will be apparent from the description, the drawings, and the claims.

BRIEF DESCRIPTION OF THE DRAWINGS

FIG. 3 is a close-up side view (at circle AB) of the circular saw blade of FIG. 1.
FIGS. 4-6 are partial cross-sectional views of the cutting inserts of the circular saw blade of FIGS. 1-3, taken along lines D-D, E-E, and F-F.

DETAILED DESCRIPTION

Figure 1:
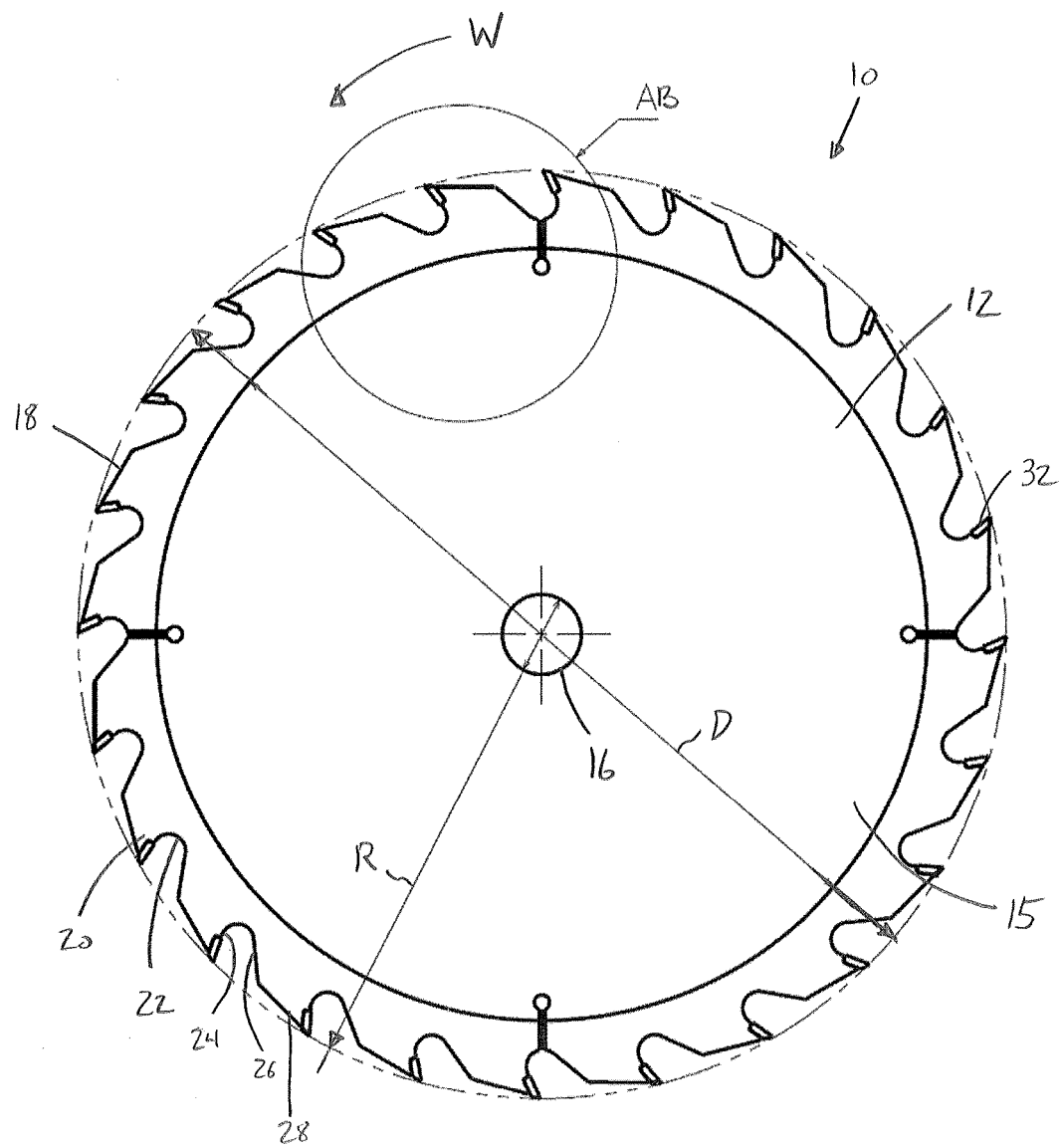
FIG. 1 is a side view of an exemplary circular saw blade.
Figure 2:
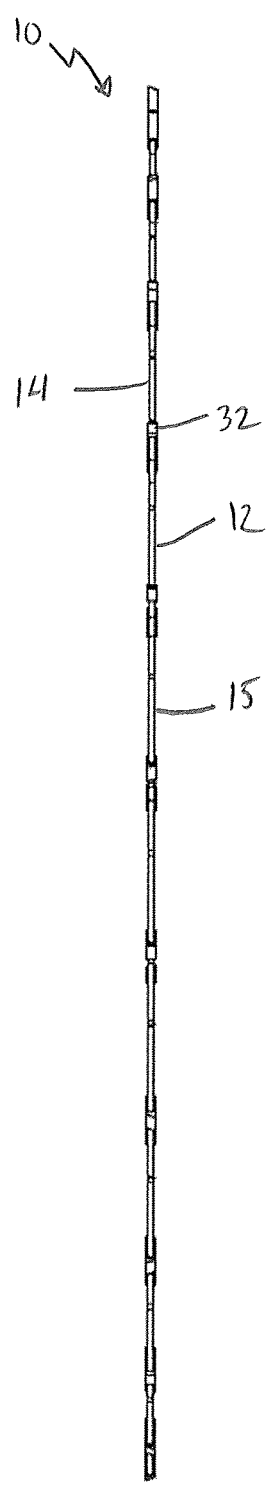
FIG. 2 is a front end view of the circular saw blade of FIG. 1.

Referring to FIGS. 1-3, in an exemplary embodiment, circular saw blades 10 optimized for use with a cordless circular saw, a cordless table saw, and/or a cordless miter saw to maximize cordless runtime is disclosed. Generally, the saw blades for use with a circular saw have a diameter of 7.25", the saw blades for use with a table saw have a diameter of 8.25", and the saw blades for use with a miter saw have a diameter of 12". However, it should be understood that the each of the circular saw blades may have other diameters, and may be interchangeably usable with each of these types of power tools. In addition, each circular saw blade may have a certain number of teeth, with a smaller number of teeth providing for a rougher finish and a larger number of teeth providing for smoother finish.

Each of the saw blades 10 includes a circular plate 12 with a left face 14, an opposite right face 15, a peripheral rim 18, and a central opening 16 coupleable to the circular saw, table saw, or miter saw, for rotation in a cutting direction W. In one implementation, the plate may have a diameter D (measured across the peripheral rim 18), a thickness T (measured from the left face 14 to the right face 15). A larger thickness T may result in slower cutting speeds and shorter cordless runtime when used with a cordless saw, but may result in better tracking along a straight line. A smaller thickness T may result in faster cutting speeds and longer cordless runtime, but may also result in deformation of the saw blade, which may cause poor tracking along a straight line during cutting. To improve cordless runtime, the thicknesses T of the blades 10 of this application are generally less than or equal to existing saw blades, without being so thin so has to have a detrimental effect on tracking. For example, for 7.25" diameter circular saw blades, the thickness T may be approximately 0.75 mm to approximately 1.06 mm (e.g., approximately 0.82 mm to approximately 0.99 mm); for 8.25" diameter table saw blades, the thickness T may be approximately 1.17 mm to approximately 1.31 mm (e.g., approximately 1.24 mm); and for 12" diameter miter saw blades, the thickness T may be approximately 1.53 mm to approximately 1.67 mm (e.g., approximately 1.60 mm). The smaller plate thickness of the saw blades of the present application can also be expressed as a ratio of the plate thickness T (in mm) to the diameter D (in inches) of the saw blade. Thus, the saw blades of the present application may have a plate thickness to diameter ratio of approximately 0.10 mm/inch to approximately 0.16 mm/inch (e.g., approximately 0.13 mm/inch to approximately 0.15 mm/inch).

Disposed about the peripheral rim 18 of the body 12 are a plurality of alternating teeth 20 and gullets 22. Each tooth 20 has a leading face 24 facing generally toward an adjacent gullet 22a in a rotational cutting direction W of the saw blade 10, a trailing face 26 facing toward an adjacent gullet 22b in a direction opposite the rotational cutting direction W, and a top face 28 extending between the leading face 24 and the trailing face 26 along the peripheral rim 18. In each tooth 20, a recess 30 is defined at an intersection between the leading face 24 and the top face 28. Received in each recess 30 is a cutting insert 32. The cutting inserts may be composed of a hard metal material, such as carbide, and more particularly tungsten carbide. The cutting inserts may be affixed in the recess 30 by known methods such as by welding, brazing, or soldering, or by using a mechanical anchor or a chemical adhesive.

Each cutting insert 32 has a rake face 34 facing toward the adjacent gullet 22a in the rotational cutting direction W, a relief face 36 extending generally along the adjacent top face 28, and a cutting edge 38 at a junction between the rake face 34 and the relief face 36. Each rake face 34 is disposed at a hook angle $\alpha$ between the rake face 34 and a radius R of the circular plate 12 extending from the center of the circular plate 12 and intersecting the cutting edge 38. A smaller hook angle may result in slower cutting speed and shorter cordless runtime when used with a cordless saw, but may provide for smoother cutting. A larger hook angle may result in faster cutting and longer cordless runtime, but may also result in choppier cutting. In addition, miter saw blades generally have smaller hook angles to avoid lift-off during cutting. To improve cordless runtime, the hook angles $\alpha$ of the saw blades 10 of this application are generally greater than or equal to comparable saw blades, without being so large so has to result in choppy cutting. For example, for 7.25" circular saw blades, the hook angle $\alpha$ may be approximately 18° to approximately 27° (e.g., approximately 20° to 25°); for 8.25" table saw blades, the hook angle $\alpha$ may be approximately 18° to approximately 27° (e.g., approximately) 20°; and, for 12" miter saw blades, the hook angle $\alpha$ may be approximately 5° to approximately 10° (e.g., approximately 7°).

Each relief face 36 is disposed at a clearance angle $\beta$ between the relief face 36 and a line T tangent to an outer circumference CIR and intersecting the cutting edge 38. A smaller clearance angle $\beta$ may provide a smoother cut, but result in slower cutting and less cordless runtime. A larger clearance angle $\beta$ may provide for faster cutting and greater cordless runtime, but may result in a rougher cut. To improve cordless runtime, the clearance angles $\beta$ of the saw blades 10 of this application are generally greater than comparable saw blades, without being so large so has to result in rough cutting. For example, for 7.25" circular saw blades, the clearance angle $\beta$ may be approximately 10° to approximately 14° (e.g., approximately 12°); for 8.25" table saw blades, the clearance angle $\beta$ may be approximately 13° to approximately 17° (e.g., approximately 15°); and for 12" miter saw blades, the clearance angle $\beta$ may be approximately 13° to approximately 17° (e.g., approximately 15°).

Referring also to FIGS. 4-6, each cutting insert 32 also has a kerf width K defined by the width of the cut formed by the cutting inserts 32. A larger kerf width K may remove too much material, resulting in poor runtime with a cordless circular saw, but may result in a more durable saw blade. A smaller kerf width K may result in a faster cutting with greater cordless runtime, but may result in a saw blade with reduced durability. To improve cordless runtime, the kerf widths K of the saw blades 10 of this application are generally less than or equal to comparable saw blades, without being so small so has to result in significantly reduced durability. For example, for 7.25" circular saw blades, the kerf width K may be approximately 1.19 mm to approximately 1.64 mm (e.g., approximately 1.27 mm to approximately 1.55 mm); for 8.25" table saw blades, the kerf width may be approximately 1.73 mm to approximately 1.87 mm (e.g., approximately 1.80 mm); and for 12" miter saw blades, the kerf width K may be approximately 2.09 mm to approximately 2.23 mm (e.g., approximately 2.16 mm).

Referring also to FIGS. 4-6, in one embodiment, the relief faces 36 may include left beveled relief faces 36L beveled toward the left face 14, right beveled relief faces 36R beveled toward the right face 15, and unbeveled relief faces 36U, arranged in a predetermined pattern. In this embodiment, the cutting inserts 12 are arranged in repeating a pattern of a left-beveled cutting insert, followed by a right-beveled cutting insert, followed by an unbeveled (or raker) cutting insert. This pattern may be referred to as an alternating top bevel with raker or ATB+R bevel pattern. As shown in FIG. 4, the left beveled cutting insert 32L has a left-beveled relief face 36L beveled toward the left face 14 of the plate 12 at a top bevel angle $\theta$L. As shown in FIG. 5, the right beveled cutting insert 32R has a right-beveled relief face 36R beveled toward the right face 15 of the plate 12 at a right bevel angle $\theta$R. As shown in FIG. 6, the unbeveled or raker cutting insert 32U has an unbeveled relief face 36U with the relief face not beveled toward either the left face 14 or the right face 15 of the plate 12. In one implementation, the top bevel angle $\theta$L of the left-beveled relief face 36L has the same magnitude as the top bevel angle $\theta$R of the right beveled relief face 36R. It has been discovered that using an ATB+R bevel pattern and using a larger bevel angle, results in faster cutting speeds and increased cordless runtime as compared to existing saw blades that have no bevel pattern or an ATB bevel pattern (with no raker) and/or smaller bevel angles. For example, in one implementation, 7.25" circular saw blades may have an ATB+R bevel pattern with left and right bevel angles $\theta$L, $\theta$R of approximately 18° to approximately 25° (e.g., approximately 20°); 8.25" table saw blades may have an ATB+R bevel pattern with left and right bevel angles $\theta$L, $\theta$R of approximately 12° to approximately 20° (e.g., approximately 15°); and 12" miter saw blades may have an ATB+R bevel pattern with left and right bevel angles $\theta$L, $\theta$R of approximately 12° to approximately 20° (e.g., approximately 15°). In other implementations, the left and right bevel angles $\theta$L, $\theta$R may be different from each other.

Figure 7:
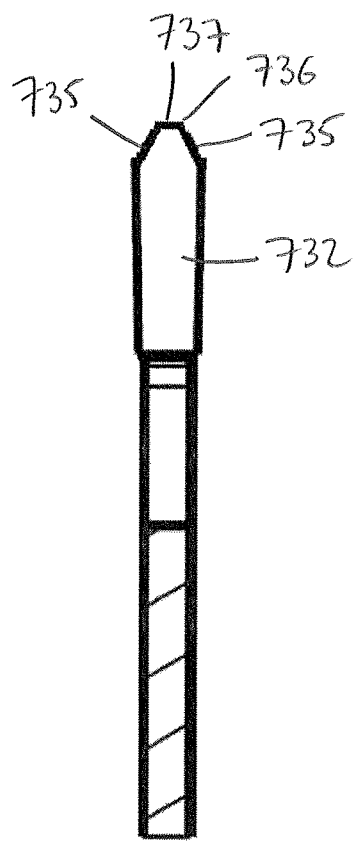
FIG. 7 is a section view of an alternate embodiment of a cutting insert for the circular saw blade of FIGS. 1-3.

In another embodiment, an ATB+R pattern may include more than one raker or unbeveled surface in the pattern (e.g., left beveled, raker, right beveled, raker). In yet other embodiments, an ATB+R pattern may include cutting inserts having more than one left bevel and/or right bevel angle in a pattern (e.g., $\theta$L-small, $\theta$L-large, $\theta$R-small, $\theta$R-large, raker). Referring to FIG. 7, in yet another alternate embodiment, cutting inserts 712 may have a relief surface 736 having a cathedral (or triple chip) grind having a pair of beveled surfaces 735 joined by a flat peak surface 737. However, it has been discovered that an ATB+R grind pattern appears to have superior runtime when used with a cordless circular saw, a cordless table saw, and a cordless miter saw.

Figure 8:
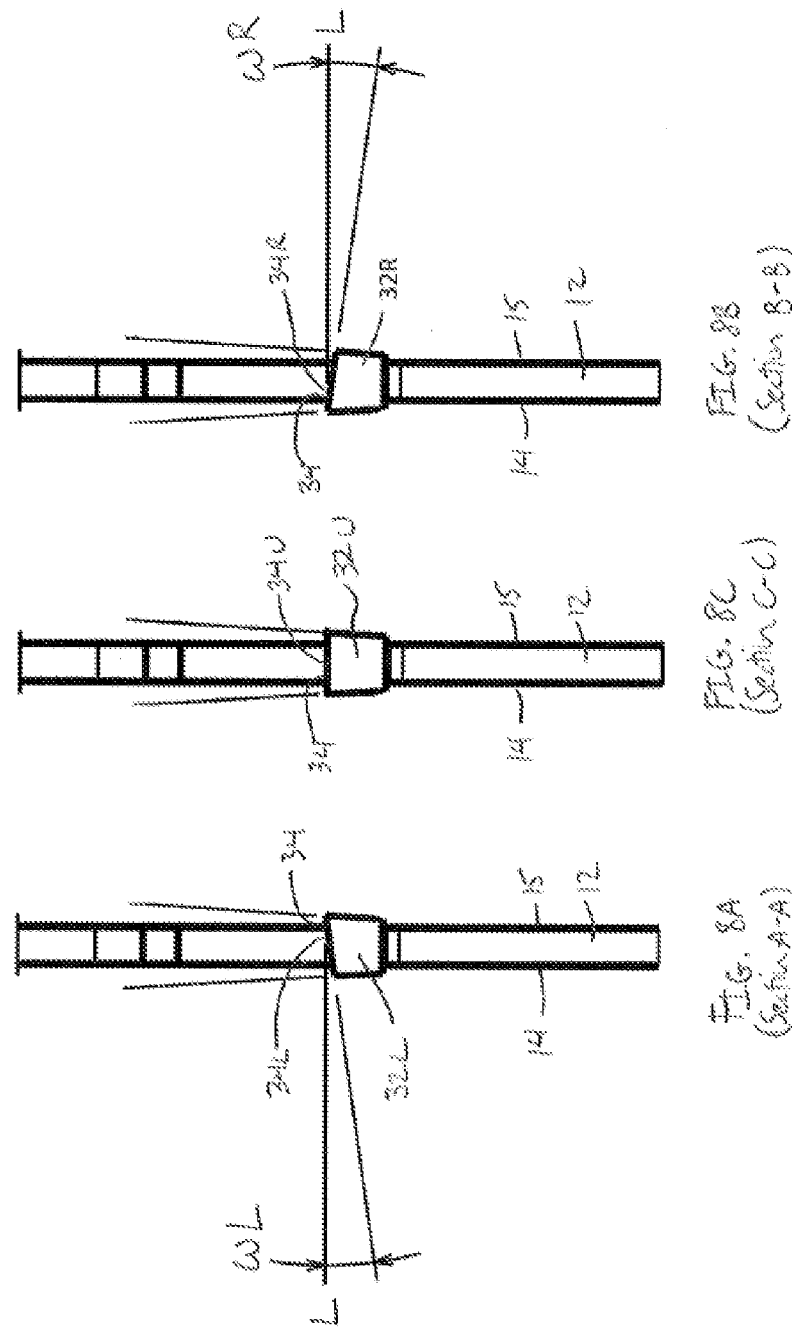
FIGS. 8A-8C are top views of the cutting inserts of the circular saw blade of FIGS. 1-3 taken along lines A-A, B-B, and C-C.

Referring also to FIGS. 8A-8C, in one embodiment, the rake faces 34 include left-beveled rake faces 34L beveled toward the left face 14 at a left rake face bevel angle ωL relative to the a line L perpendicular to the plate 12, right-beveled rake faces 34R beveled toward the right face 15 at a right rake face bevel angle ωR, and unbeveled rake faces 34U, arranged in a predetermined pattern. In one implementation, the pattern of the left-beveled rake faces 34L, the right-beveled rake faces 34R, and the unbeveled rake faces 34U may correspond to the bevel pattern of the relief faces 36 (e.g., an ATB+R pattern). In FIG. 8A, the rake face 34L of the cutting insert 32L, which has its relief face 36L beveled toward the left face 14, is also beveled toward the left face 14 at a face bevel angle ωL. In FIG. 8B, the rake face 34R of the cutting insert 32R, which has its relief face 36R beveled toward the right face 15, is also beveled toward the right face 15 at a face bevel angle ωR. In FIG. 8C, the rake face 34U of the cutting insert 32U, which has its relief face 36U unbeveled, is also unbeveled. Thus, the rake faces 34 may be beveled in the same ATB+R pattern as the relief faces 36. It has been discovered that using the ATB+R bevel pattern and having a larger rake face bevel angle results in faster cutting speeds and increased cordless runtime as compared to existing saw blades that have an ATB bevel pattern (with no raker) and/or a smaller or no face bevel angle. For example, in one implementation, 7.25" circular saw blades, 8.25" table saw blades, and 12" miter saw blades each have a rake faces beveled in an ATB+R pattern with rake face bevel angles ωL and ωL of approximately 6° to approximately 10° (e.g., approximately 8°). In other implementations, the left and right rake face bevel angles ωL and ωL may be different from each other.

Figure 9:
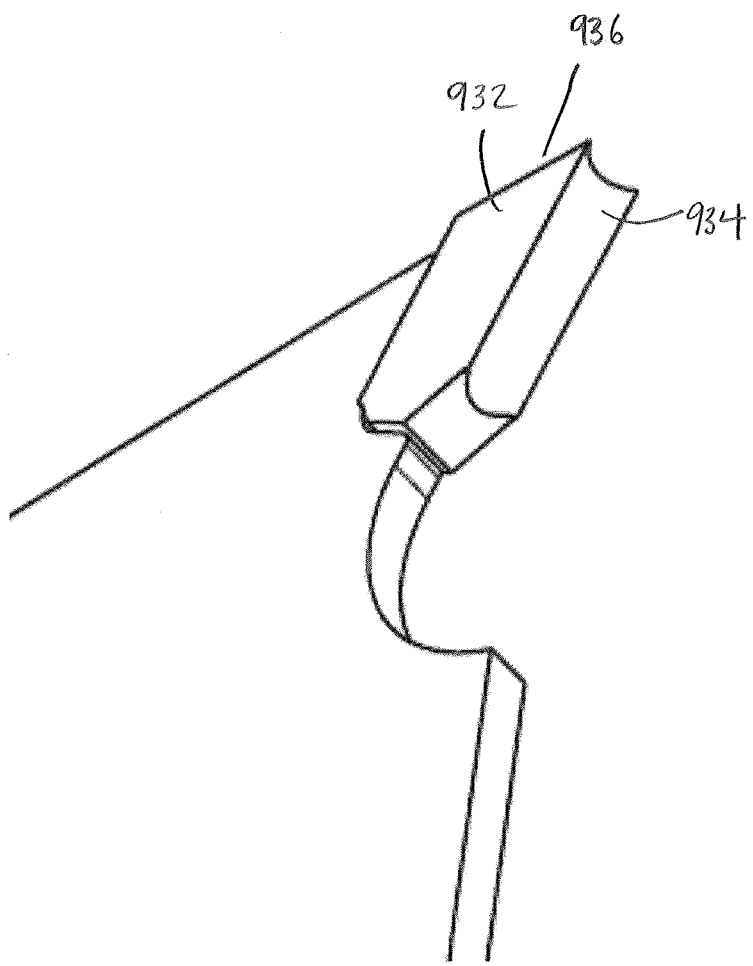
FIG. 9 is a perspective view of an alternate embodiment of a cutting insert for the circular saw blade of FIGS. 1-3.

Referring to FIG. 9, in an alternate embodiment, cutting inserts 932 may have a rake faces 934 that are not beveled, but instead have a concave profile, referred to as a hollow grind. A rake face 934 with a hollow grind may be combined with relief faces 936 that are beveled (e.g., in an ATB or ATBR pattern) or that are unbeveled.

A series of tests were performed to determine the geometry and dimensions of saw blades according to the present disclosure that are improved or optimized for runtime of a cordless circular saw, cordless table saw, and/or cordless miter saw to which the saw blade is coupled, while still maintaining saw blade life and the smoothness and straightness of the cuts made by the saw blades.

In one set of tests, a set of prototype 7.25" circular saw blades were compared against the aforementioned DEWALT DW3199 7.25" Carbide Tipped Circular Saw Blade in cutting with a cordless circular saw. Each saw blade was mounted to the same DEWALT 60V MAX cordless circular saw and a series of cross-cuts were made across a piece of 2"×10" yellow pine at a constant feed rate so that each cut was made in approximately 4 to 6 seconds. The test continued until the battery was discharged to the point where the circular saw could no longer rotate the saw blade to effect a cut. The total number of cuts was measured to determine the number of cuts per battery charge. This test was performed several times for each blade in order to obtain an average number of cuts per battery charge. The following table shows the results of the tests performed on various prototypes of 7.25" diameter saw blades according to the present disclosure, as compared to the DEWALT DW3199 7.25" Carbide Tipped Circular Saw Blade:

| Prototype | Relief Face Bevel Pattern | Top Bevel Angle θL, θR | Rake Face Bevel Angle ωL, ωR | Honk Angle α | Clearance Angle β | Plate Thickness T (mm) | Cuts per Battery Charge | Improvement vs. DW3199 |
|---|---|---|---|---|---|---|---|---|
| 1 | None | 0° | Hollow | 25° | 12° | 0.76 | 142.0 | 27% |
| 2 | None | 0° | Hollow | 25° | 12° | 0.99 | 133.7 | 19% |
| 3 | ATB + R | 10° | Hollow | 25° | 12° | 0.76 | 140.7 | 26% |
| 4 | ATB + R | 20° | Hollow | 25° | 12° | 0.88 | 140.3 | 25% |
| 5 | ATB | 20° | Hollow | 25° | 12° | 0.88 | 130.7 | 17% |
| 6 | ATB + R | 20° | 8° | 25° | 12° | 0.82 | 162.0 | 45% |
| 7 | ATB | 20° | 8° | 18°-25° | 12° | 0.99 | 130.0 | 16% |
| DW3199 | ATB | 15° | 4° | 18° | 12° | 0.99 | 112.0 | — |

As seen in the above table, each of the prototypes have significantly improved cordless runtime as compared with DW3199 circular saw blade. Notably, Prototype 6, with the ATB+R top bevel, a larger top bevel angle, a larger hook angle, and a smaller plate thickness had the most significant and unexpected improvement in cordless runtime. Thus, it was posited that a circular saw blade with carbide cutting inserts can be optimized for cordless runtime by reducing or holding constant the plate thickness T (e.g., approximately 0.75 mm to approximately 0.99 mm for 7.25" saw blades), disposing the rake faces at a more aggressive hook angle α (e.g., approximately 18° to approximately 25° for 7.25" saw blades), disposing the rake faces at a larger face bevel angle ω (e.g., approximately 6° to approximately 10° for 7.25" saw blades), and arranging the cutting inserts in an ATB+R top bevel pattern with the relief faces beveled toward the left and right faces of the plate at more aggressive top bevel angles θL and θR (e.g., approximately 10° to approximately 20° for 7.25" saw blades).

The principles discovered for optimizing cordless runtime in these initial tests were used in further designs of circular saw blades of various sizes for use with cordless circular saws, table saws, and miter saws. First, a prototype 7.25" 24-teeth circular saw blades having a design similar to Prototype 6, but with a somewhat larger plate thickness of 0.99 mm, was compared to the aforementioned DEWALT DW3199 7.25" 24-Teeth Precision Finishing Circular Saw Blade and the aforementioned DEWALT DW3178 7.25" 24-Teeth Construction Framing Circular Saw Blade, in cutting using a cordless circular saw. Each saw blade was mounted to the same DEWALT 60V MAX cordless circular saw and a series of 4-foot cuts were made across a double stack of 0.75" plywood with a bias of 3.5 lbs. The test continued until the battery was discharged to the point where the circular saw could no longer rotate the saw blade to effect the desired cut. The total number of cuts was measured to determine the number of cuts per battery charge. This test was performed several times for each blade in order to obtain an average number of cuts per battery charge. The following tables show the results of these tests.

| Saw Blade | Relief Face Bevel Pattern | Top Bevel Angle θL, θR | Rake Face Bevel Angle ωL, ωR | Hook Angle α | Clearance Angle β | Plate Thickness T (mm) | Cuts per Battery Charge | Improvement of Prototype |
|---|---|---|---|---|---|---|---|---|
| Prototype | ATBR | 20° | 4° | 25° | 12° | 0.99 | 33.6 | 19% |
| DW3199 | ATB | 15° | 4° | 18° | 12° | 0.99 | 28.3 | — |

| Saw Blade | Relief Face Bevel Pattern | Top Bevel Angle θL, θR | Rake Face Bevel Angle ωL, ωR | Hook Angle α | Clearance Angle β | Plate Thickness T (mm) | Cuts per Battery Charge | Improvement of Prototype |
|---|---|---|---|---|---|---|---|---|
| Prototype | ATBR | 20° | 4° | 25° | 12° | 0.99 | 33.6 | 24% |
| DW3178 | ATB | 10° | None | 18° | 11° | 1.13 | 27.1 | — |

As seen in the above table, the circular saw blade prototype has significantly improved cordless runtime as compared with both the DW3199 and DW3178 circular saw blades in cutting with a cordless circular saw. It is believed that the improved runtime is due to a combination of one or more of an ATB+R top bevel pattern, a larger top bevel angle, a larger hook angle, a larger rake face bevel angle, and a plate thickness that is smaller or the same as the existing saw blades.

Second, a prototype of an 8.25" 24-teeth table saw blade was compared to the aforementioned the DEWALT DW3182 8.25" 24-Teeth Table Saw Blade, in cutting using a cordless table saw. Each saw blade was mounted to the same DEWALT 60V MAX cordless table saw and a series of 4-foot cuts were made across a 2"×10" piece of yellow pine with a normal bias. The test continued until the battery was discharged to the point where the circular saw could no longer rotate the saw blade to effect the desired cut. The total number of cuts was measured to determine the number of cuts per battery charge. This test was performed several times for each blade in order to obtain an average number of cuts per battery charge. The following table shows the results of these tests.

| Saw Blade | Relief Face Bevel Pattern | Top Bevel Angle θL, θR | Rake Face Bevel Angle ωL, ωR | Hook Angle α | Clearance Angle β | Plate Thickness T (mm) | Cuts per Battery Charge | Improvement of Prototype |
|---|---|---|---|---|---|---|---|---|
| Prototype | ATB + R | 15° | 8° | 20° | 15° | 1.24 | 31.6 | 42% |
| DW3182 | ATB | 10° | None | 20° | 11° | 1.32 | 22.2 | — |

As seen in the above table, the prototype has significantly improved cordless runtime as compared with DW3182 circular saw blades in cutting with a cordless table saw. It is believed that the improved runtime is due to a combination of one or more of an ATB+R relief face bevel, a larger top bevel angle, a larger or equal hook angle, a larger rake face bevel angle, and a plate thickness that is smaller than corresponding values in existing table saw blades.

Third, a prototype of a 12" 60-teeth miter saw blade was compared to the aforementioned DEWALT DW3178 12" 60-Teeth Fine Finish Miter Saw Blade and the aforementioned DEWALT DW3216 12" 60-Teeth Precision Trim™ Miter Saw Blade, in cutting using a cordless miter saw. Each saw blade was mounted to the same DEWALT 120V MAX cordless miter saw and a series of 9.5" cross cuts were made in a 2"×10" piece of yellow pine with a normal bias. The test continued until the battery was discharged to the point where the circular saw could no longer rotate the saw blade to effect the desired cut. The total number of cuts was measured to determine the number of cuts per battery charge. This test was performed several times for each blade in order to obtain an average number of cuts per battery charge. The following tables show the results of these tests.

| Saw Blade | Relief Face Bevel Pattern | Top Bevel Angle θL, θR | Rake Face Bevel Angle ωL, ωR | Hook Angle α | Clearance Angle β | Plate Thickness T (mm) | Cuts per Battery Charge | Improvement of Prototype |
|---|---|---|---|---|---|---|---|---|
| Prototype | ATB + R | 15° | 8° | 7° | 15° | 1.60 | 197.2 | 25% |
| DW3178 | ATB | 12° | 4° | 7° | 14° | 2.00 | 158.2 | — |

| Saw Blade | Relief Face Bevel Pattern | Top Bevel Angle θL, θR | Rake Face Bevel Angle ωL, ωR | Hook Angle α | Clearance Angle β | Plate Thickness T (mm) | Cuts per Battery Charge | Improvement of Prototype |
|---|---|---|---|---|---|---|---|---|
| Prototype | ATB + R | 15° | 8° | 7° | 15° | 1.60 | 197.2 | 20% |
| DW3216 | ATB | 10° | None | 7° | 11° | 1.75 | 164.5 | — |

As seen in the above table, the prototype saw blade has significantly improved cordless runtime as compared with DW3178 and DW3216 miter saw blades in cutting with a cordless miter saw. It is believed that the improved runtime is due to a combination of one or more of an ATB+R relief face bevel, a larger top bevel angle, a larger or equal hook angle, a larger rake face bevel angle, and a plate thickness that is smaller than corresponding values in existing miter saw blades.

The above principles discovered for saw blade design to optimize cordless runtime in circular saw blades may be used in various other designs for various sizes of circular saw blades for use with cordless plunge saws, circular saws, table saws, and miter saws. The following table show exemplary designs for such circular saw blades:

be larger, e.g., approximately 20° to 25° for these blades. It should also be noted that for all of these blades the tooth count is a whole number multiple of three to enable the ATB+R pattern to be maintained around the entire circumference of the blades. The saw blades with the larger number of teeth provide a finer finish to the workpiece. All values set forth in the above table are approximate and set forth with sufficient precision as would be understood by one of ordinary skill in the art in the context of the various elements, components, regions, layers and/or sections being described. For example, the plate thickness values may vary by approximately ±0.05 mm to 0.07 mm and the angles may vary by approximately ±2° to 5°.

Example embodiments have been provided so that this disclosure will be thorough, and to fully convey the scope to

| Diameter (inches) | Diameter (mm) | Tooth Count | Relief Face Bevel Pattern | Top Bevel Angle θL, θR | Hook Angle α | Clearance Angle β | Rake Face Bevel ω | Plate Thickness T (mm) | Kerf Width (mm) | T/D (mm/in) |
|---|---|---|---|---|---|---|---|---|---|---|
| 6.50 | 165 | 24 T | ATB + R | 20° | 10° | 15° | 4° | 1.27 | 1.93 | 0.19 |
| 6.50 | 165 | 42 T | ATB + R | 20° | 10° | 15° | 4° | 1.27 | 1.93 | 0.19 |
| 7.25 | 184 | 24 T | ATB + R | 20° | 25° | 12° | 4° | 0.99 | 1.55 | 0.14 |
| 7.25 | 184 | 36 T | ATB + R | 20° | 25° | 12° | 4° | 0.99 | 1.55 | 0.14 |
| 7.25 | 184 | 60 T | ATB + R | 20° | 25° | 12° | 4° | 0.99 | 1.55 | 0.14 |
| 7.50 | 190 | 24 T | ATB + R | 20° | 25° | 12° | 4° | 0.99 | 1.55 | 0.13 |
| 7.50 | 190 | 36 T | ATB + R | 20° | 25° | 12° | 4° | 0.99 | 1.55 | 0.13 |
| 7.50 | 190 | 60 T | ATB + R | 20° | 25° | 12° | 4° | 0.99 | 1.55 | 0.13 |
| 8.25 | 210 | 24 T | ATB + R | 15° | 20° | 15° | 8° | 1.24 | 1.80 | 0.15 |
| 8.25 | 210 | 36 T | ATB + R | 15° | 20° | 15° | 8° | 1.24 | 1.80 | 0.15 |
| 8.25 | 210 | 60 T | ATB + R | 15° | 20° | 15° | 8° | 1.24 | 1.80 | 0.15 |
| 8.50 | 216 | 24 T | ATB + R | 15° | 7° | 15° | 8° | 1.60 | 2.16 | 0.19 |
| 8.50 | 216 | 36 T | ATB + R | 15° | 7° | 15° | 8° | 1.60 | 2.16 | 0.19 |
| 8.50 | 216 | 60 T | ATB + R | 15° | 7° | 15° | 8° | 1.60 | 2.16 | 0.19 |
| 10.00 | 250 | 24 T | ATB + R | 15° | 7° | 15° | 8° | 1.60 | 2.16 | 0.16 |
| 10.00 | 250 | 36 T | ATB + R | 15° | 7° | 15° | 8° | 1.60 | 2.16 | 0.16 |
| 10.00 | 250 | 60 T | ATB + R | 15° | 7° | 15° | 8° | 1.60 | 2.16 | 0.16 |
| 12.00 | 305 | 42 T | ATB + R | 15° | 7° | 15° | 8° | 1.60 | 2.16 | 0.13 |
| 12.00 | 305 | 60 T | ATB + R | 15° | 7° | 15° | 8° | 1.60 | 2.16 | 0.13 |
| 12.00 | 305 | 78 T | ATB + R | 15° | 7° | 15° | 8° | 1.60 | 2.16 | 0.13 |

In the above table, the 6.5" blades are intended for use with a cordless plunge saw, the 7.25" and 7.5" blades are intended for use with a cordless circular saw, the 8.25" are intended for use with a cordless circular saw or a cordless table saw, and the 8.5 blades, the 10" blades and the 12" blades are intended for use with a cordless miter saw. The 6.25" plunge saw blades have a smaller hook angle and a larger plate thickness than the 7.25" circular saw blades. This is because the plunge saw blades are intended for use with a cordless plunge saw having a guide track for cutting plywood panels to precise widths and lengths. The smaller hook angle and the larger plate thickness allows these blades to create cuts in plywood with lower tear-out and better surface finish than would be possible with the larger hook angle and smaller plate thickness of the 7.25" circular saw blades. It should be noted that existing plunge saw blades have an even smaller hook angle (e.g., 5°) and an even larger plate thickness (e.g., 1.54 mm) than these new plunge saw blades. These new plunge saw blades have dramatically increased cordless runtime as compared to existing plunge saw blades. It should also be noted that the hook angles on the 8.5", 10" and 12" miter saw blades are smaller than the hook angles on the circular saw blades and table saw blades. Although, based on the above described disclosure, a larger hook angle would be expected to even further increase cordless runtime, the smaller hook angle is desired in order to prevent lift-off from a workpiece when being used in a miter saw. If lift-off were not a concern, the hook angle could those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described. Even if the word "generally," "substantially," approximately" and "about" is not used, all positions, sizes, dimensions, or values of various elements, components, regions, layers and/or sections disclosed and claimed in this application are "approximate" within the meaning set forth in this paragraph.

Numerous modifications may be made to the exemplary implementations described above. These and other implementations are within the scope of this disclosure and the following claims.

What is claimed is:

1. A circular saw blade comprising:
   a circular plate having a diameter (D), a thickness (T), a left face, a right face, a peripheral rim, and a central opening couplable to a powered saw for rotation in a cutting direction;
   a plurality of alternating teeth and gullets disposed about the peripheral rim, each tooth having a front face facing generally toward an adjacent gullet in the cutting direction and a recess defined in the front face; and
   a plurality of cutting inserts, each insert affixed in one of the recesses in the teeth and having a rake face facing generally toward the adjacent gullet in the cutting direction, a relief face extending generally toward an adjacent top face, and a cutting edge at a junction between the relief face and the rake face,
   wherein each rake face is disposed at a hook angle ($\alpha$) between the rake face and a radius of the circular plate intersecting the cutting edge,
   wherein the relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern, and
   wherein: (a) the plate diameter (D) is 6.5", the plate thickness (T) is 1.20 mm to 1.34 mm, and the hook angle ($\alpha$) is 8° to 12°; (b) the plate diameter (D) is 7.25" to 7.50", the plate thickness (T) is 0.75 mm to 1.06 mm, and the hook angle ($\alpha$) is 18° to 27°; (c) the plate diameter (D) is 8.25" to 8.50", the plate thickness (T) is 1.17 mm to 1.67 mm, and the hook angle ($\alpha$) is 18° to 27°; or (d) the plate diameter (D) is 10" to 12", the plate thickness (T) is 1.53 mm to 1.67 mm, and the hook angle ($\alpha$) is 5° to 10°, and wherein a ratio of the thickness (T) (in mm) to the diameter (D) (in inches) is 0.10 mm/inch to 0.19 mm/inch.

2. The circular saw blade of claim 1, wherein each relief face has a clearance angle ($\beta$) between the relief face and a line tangent to an outer circumference of the circular plate that intersects the cutting edge, and (a) if the plate diameter (D) is 6.5", the clearance angle ($\beta$) is 12° to 18°; (b) if the plate diameter (D) is 7.25" to 7.50", the clearance angle ($\beta$) is 10° to 15°; (c) if the plate diameter (D) is 8.25" to 8.50", the clearance angle ($\beta$) is 12° to 18°; and (d) if the plate diameter (D) is 10" to 12", the clearance angle ($\beta$) is 12° to 18°.

3. The circular saw blade of claim 1, wherein the left-beveled relief faces and the right-beveled relief faces are beveled toward the left and right faces of the circular plate at top bevel angles, and (a) if the plate diameter (D) is 6.50", the top bevel angles are 18° to 25°; (b) if the plate diameter (D) is 7.25" to 7.50", the top bevel angles are 18° to 25°; (c) if the plate diameter (D) is 8.25" to 8.50", the top bevel angles are 12° to 20°; and (d) if the plate diameter (D) is 10" to 12", the top bevel angles are 12° to 20°.

4. The circular saw blade of claim 1, wherein the rake faces include a plurality of left-beveled rake faces and a plurality of right-beveled rake faces beveled toward the left and right faces of the circular plate at left and right rake face bevel angles ($\omega L$) and ($\omega R$) relative to a line (L) perpendicular to the circular plate.

5. The circular saw blade of claim 4, wherein the rake faces further include a plurality of unbeveled rake faces, the rake faces being arranged in an alternating top bevel plus raker (ATB+R) pattern.

6. The circular saw blade of claim 4, wherein the left and right rake face bevel angles ($\omega L$) and ($\omega R$) are each 2° to 10°.

7. The circular saw blade of claim 1, wherein each rake face has a hollow grind with a concave profile.

8. The circular saw blade of claim 1, wherein each of the cutting inserts has a kerf width (K), and (a) if the plate diameter (D) is 6.5", the kerf width (K) is 1.86 mm to 2.0 mm; (b) if the plate diameter (D) is 7.25" to 7.50", the kerf width (K) is 1.48 mm to 1.62 mm; (c) if the plate diameter (D) is 8.25" to 8.50", the kerf width (K) is 1.73 mm to 2.23 mm; and (d) if the plate diameter (D) is 10" to 12", the kerf width (K) is 2.09 mm to 2.23 mm.

9. A circular saw blade comprising:
   a circular plate having a diameter (D), a thickness (T), a left face, a right face, a peripheral rim, and a central opening couplable to a powered saw for rotation in a cutting direction wherein a ratio of the thickness (T) (in mm) to the diameter (D) (in inches) is 0.10 mm/inch to 0.19 mm/inch;

a plurality of alternating teeth and gullets disposed about the peripheral rim, each tooth having a front face facing generally toward an adjacent gullet in the cutting direction and a recess defined in the front face; and a plurality of cutting inserts, each insert affixed in one of the recesses in the teeth and having a rake face facing generally toward the adjacent gullet in the cutting direction, a relief face extending generally toward the adjacent top face, and a cutting edge at a junction between the relief face and the rake face, wherein the relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern, and wherein the rake faces include a plurality of the left-beveled rake faces beveled toward the left face of the circular plate at a left rake face bevel angle (ωL) of 2° to 10° relative to a line (L) perpendicular to the plate, a plurality of right-bevel rake faces beveled toward the right face of the circular plate at a right rake face bevel angle (ωR) of 2° to 10° relative to the line (L), and a plurality of unbeveled rake faces, the rake faces arranged in an alternating top bevel plus raker (ATB+R) pattern.

10. The circular saw blade of claim 9 wherein: (a) the plate diameter (D) is 6.5" and the plate thickness (T) is 1.20 mm to 1.34 mm; (b) the plate diameter (D) is 7.25" to 7.50" and the plate thickness (T) is 0.75 mm to 1.06 mm; (c) the plate diameter (D) is 8.25" to 8.50" and the plate thickness (T) is 1.17 mm to 1.67 mm; or (d) the plate diameter (D) is 10" to 12", the plate thickness (T) is 1.53 mm to 1.67 mm.

11. The circular saw blade of claim 9 wherein each rake face disposed at a hook angle (α) between the rake face and a radius of the circular plate intersecting the cutting edge and (a) the plate diameter (D) is 6.5" and the hook angle α is 8° to 12°; (b) the plate diameter (D) is 7.25" to 7.50" and the hook angle (α) is 18° to 27°; (c) the plate diameter (D) is 8.25" to 8.50" and the hook angle (α) is 18° to 27°; or (d) the plate diameter (D) is 10" to 12" and the hook angle (α) is 5° to 10°.

12. The circular saw blade of claim 9, wherein each relief face has a clearance angle (β) between the relief face and a line tangent to an outer circumference of the circular plate that intersects the cutting edge, and (a) the plate diameter (D) is 6.5" and the clearance angle (β) is 12° to 18°; (b) the plate diameter (D) is 7.25" to 7.50" and the clearance angle (β) is 10° to 15°; (c) the plate diameter (D) is 8.25" to 8.50" and the clearance angle (β) is 12° to 18°; or (d) the plate diameter (D) is 10" to 12" and the clearance angle (β) is 12° to 18°.

13. The circular saw blade of claim 9, wherein the left- and right-beveled relief faces are beveled toward the left and right faces of the plate at top bevel angles, and (a) the plate diameter (D) is 6.50" and the top bevel angles are 18° to 25°; (b) the plate diameter (D) is 7.25" to 7.50" and the top bevel angles are 18° to 25°; (c) the plate diameter (D) is 8.25" to 8.50" and the top bevel angles are 12° to 20°; or (d) the plate diameter (D) is 10" to 12" and the top bevel angles are 12° to 20°.

14. The circular saw blade of claim 9, wherein each of the cutting inserts has a kerf width (K), and (a) the plate diameter (D) is 6.5", the kerf width K (K) is 1.86 mm to 2.0 mm; (b) the plate diameter (D) is 7.25" to 7.50", the kerf width (K) is 1.48 mm to 1.62 mm; (c) the plate diameter (D) is 8.25" to 8.50", the kerf width (K) is 1.73 mm to 2.23 mm; and (d) the plate diameter (D) is 10" to 12", the kerf width (K) is 2.09 mm to 2.23 mm.

15. A circular saw blade comprising:

a circular plate having a diameter (D), a thickness (T), a left face, a right face, a peripheral rim, and a central opening couplable to a powered saw for rotation in a cutting direction;

a plurality of alternating teeth and gullets disposed about the peripheral rim, each tooth having a front face facing generally toward an adjacent gullet in the cutting direction and a recess defined in the front face; and a plurality of cutting inserts, each insert affixed in one of the recesses in the teeth and having a rake face facing generally toward the adjacent gullet in the cutting direction, a relief face extending generally toward the adjacent top face, and a cutting edge at a junction between the relief face and the rake face, wherein the relief faces include a plurality of unbeveled relief faces, left-beveled relief faces beveled toward the left face of the circular plate, and a plurality of right-beveled relief faces beveled toward the right faces of the circular plate, the relief faces arranged in an alternating top bevel with raker (ATB+R) bevel pattern, wherein a ratio of the thickness (T) (in mm) to the diameter (D) (in inches) is 0.10 mm/inch to 0.19 mm/inch, and wherein each rake face disposed at a hook angle (α) between the rake face and a radius of the circular plate intersecting the cutting edge, and the hook angle (α) is 15° to 27° if the saw blade is for use with a plunge saw, a circular saw or a table saw and the hook angle (α) is 5° to 10° if the saw blade is for use with a miter saw.

16. The circular saw blade of claim 15, wherein: (a) the plate diameter (D) is 6.5" and the plate thickness (T) is 1.20 mm to 1.34 mm; (b) the plate diameter (D) is 7.25" to 7.50" and the plate thickness (T) is 0.75 mm to 1.06 mm; (c) the plate diameter (D) is 8.25" to 8.50" and the plate thickness (T) is 1.17 mm to 1.67 mm; or (d) the plate diameter (D) is 10" to 12", the plate thickness (T) is 1.53 mm to 1.67 mm.

17. The circular saw blade of claim 16, wherein: (a) the plate diameter (D) is 6.5" and the hook angle (α), is 8° to 12°; (b) the plate diameter (D) is 7.25" to 7.50" and the hook angle (α), is 18° to 27°; (c) the plate diameter (D) is 8.25" to 8.50" and the hook angle (α) is 18° to 27°; or (d) the plate diameter (D) is 10" to 12" and the hook angle (α), is 5° to 10°.

18. The circular saw blade of claim 15, wherein each top face has a clearance angle (β) between the top face and a line tangent to an outer circumference of the circular plate, and (a) the plate diameter (D) is 6.5" and the clearance angle (β) is 12° to 18°; (b) the plate diameter (D) is 7.25" to 7.50" and the clearance angle (β) is 10° to 15°; (c) the plate diameter (D) is 8.25" to 8.50" and the clearance angle (β) is 12° to 18°; or (d) the plate diameter (D) is 10" to 12" and the clearance angle (β) is 12° to 18°.

19. The circular saw blade of claim 15, wherein beveled relief faces are beveled toward the left and right faces of the plate at top bevel angles, and (a) the plate diameter (D) is 6.50" and the top bevel angles are 18° to 25°; (b) the plate diameter (D) is 7.25" to 7.50" and the top bevel angles are 18° to 25°; (c) the plate diameter (D) is 8.25" to 8.50" and the top bevel angles are 12° to 20°; or (d) the plate diameter (D) is 10" to 12" and the top bevel angles are 12° to 20°.

20. The circular saw blade of claim 15, wherein each of the cutting inserts has a kerf width (K), and (a) if the plate diameter (D) is 6.5", the kerf width (K) is 1.86 mm to 2.0 mm; (b) if the plate diameter (D) is 7.25" to 7.50", the kerf width (K) is 1.48 mm to 1.62 mm; (c) if the plate diameter (D) is 8.25" to 8.50", the kerf width (K) is 1.73 mm to 2.23 mm; and (d) if the plate diameter (D) is 10" to 12", the kerf width (K) is 2.09 mm to 2.23 mm.

* * * * *